3,443,019
SPACER DAMPER
Robert C. Walker, Cooksville, Ontario, and Gordon J. Clarke, Bramalea, Ontario, Canada, assignors to Lacol Industries Limited, Newmarket, Ontario, Canada
Continuation-in-part of application Ser. No. 666,816, Sept. 11, 1967. This application June 20, 1968, Ser. No. 738,646
Int. Cl. H02g 7/14, 7/12
U.S. Cl. 174—42                                 4 Claims

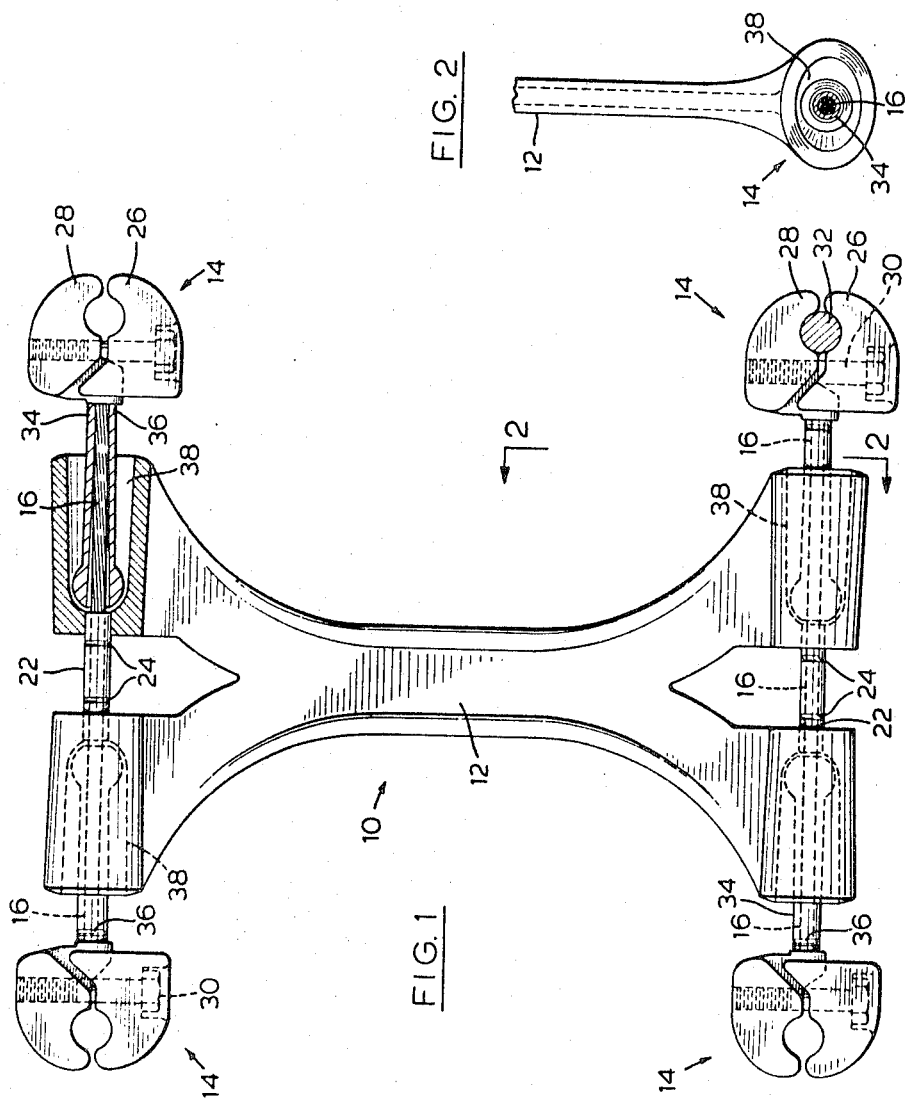
May 6, 1969  R. C. WALKER ETAL  3,443,019
SPACER DAMPER
Filed June 20, 1968
INVENTOR.
ROBERT C. WALKER
GORDON J. CLARKE
BY Fetherstonhaugh & Co.
ATTORNEYS United States Patent Office 3,443,019
Patented May 6, 1969

ABSTRACT OF THE DISCLOSURE

The invention relates to a spacer damper for bundle conductors of an electricity transmission line wherein the conductors are held in clamps at the end of resilient wires, which are adapted to flex under the influence of aeolian vibration whereby in use the energy of the aeolian vibration is dissipated in the flexing of the arms and in the flexing of the conductor itself due to the effective weight of the spacer damper at the mounting point of the arms on the frame of the spacer damper.

---

This invention relates to a spacer damper assembly for a bundle conductor electricity transmission line, and is a continuation-in-part to application Ser. No. 666,816, filed Sept. 11, 1967, now abandoned.

It is common to transmit electricity over bundle conductors wherein the individual conductors are retained in spaced relation by means of bundle suspension brackets at the towers and bundle spacers between the towers. A common bundle spacing is the quaded spacing wherein four conductors are spaced at the suspension brackets and at the spacers in a quaded arrangement.

It is also common practice to provide means for damping aeolian vibration. Various forms of dampers have been used, and they are all similar in the sense that they dissipate the energy of the conductor vibration in a twisting of the conductor and/or by flexing a resilient means externally of the conductor. Some mechanical forms of dampers are superior mechanically and operate with greater efficiency than others.

It is an object of this invention to provide a new spacer damper assembly wherein a damping arrangement for aeolian vibration is incorporated in a spacer assembly that is effective and wherein the energy of the aeolian vibration of the conductor is dissipated in a twisting of the conductors induced by the damper and in the resilience of resilient conductor mounting arms carried by the spacer frame.

It is a further object of this invention to provide a new assembly having a damping arrangement for aeolian vibration having resilient conductor mounting arms designed to inhibit aeolian vibration, wherein means are provided for limiting the movement of the arms under conditions of abnormally high loading, such as icing, short circuit loads and the like.

It is a further object of the invention to provide a spacer damper assembly that is rugged and weatherproof.

With these and other objects in view, the spacer damper assembly for a bundle of conductors according to this invention comprises a frame, a plurality of conductor clamps, and a resilient wire for resiliently mounting each of the clamps on the frame. The resilient wire connects at one end with the frame and at its other end with its respective clamp. The spacer damper has a design effective weight at the point of connection of the resilient wire to the frame, and the resilient wire has a resilience that is limited to result in twisting of a conductor held in its respective clamp under the influence of said effective weight when the conductor vibrates under aeolian vibration in use and a resilience that is great enough to result in flexing thereof under the influence of the effective weight when the conductor vibrates under aeolian vibration whereby to dampen aeolian vibration in use. The invention will be clearly understood after reference to the following detailed specification read in conjunction with the drawings.

In the drawings,

FIGURE 1 is a side elevation of a spacer damper assembly according to this invention partly broken away to illustrate construction; and FIGURE 2 is a view along the line 2—2 of FIGURE 1.

Referring to the drawings, the numeral 10 generally indicates a spacer damper according to this invention. It consists of a frame 12 made of cast aluminum and has four similar conductor clamps, each generally indicated by the numeral 14.

The conductor clamps are each resiliently mounted with respect to the frame 12 by means of a multistrand resilient wire 16.

It will be noted that the clamps are arranged in an upper pair and a lower pair, and that the resilient mounting wires 16 for each pair have their axes substantially aligned. The wires 16 for each pair are in fact a continuous piece of wire that extends through a steel sleeve 22 that is cast into place in the aluminum frame 12. A die bite is impressed in the sleeve as at 24 to secure the mounting wires 16 with respect to the frame. The clamps 14 have a lower jaw 26 and an upper jaw 28, which are closed with respect to each other by means of a bolt 30 in the usual way to clamp a conductor 32, as indicated in the clamp at the lower right hand corner of FIGURE 1.

Lower clamp jaws 26 has a sleeve 34 cast integrally therewith that extends around the resilient mounting wires 16, and the clamps are secured to the wire adjacent the free end of the wire by means of a die bite as at 36.

In use, as will be explained later, the resilient wires 16 flex under the influence of aeolian vibration. The amount of flexing necessary to dissipate aeolian vibration in use is relatively small, but there are abnormal loads that are impressed upon the wires 16 in use that tend to be substantially greater and it is necessary to provide means for limiting the flexing of the wires 16 under these other abnormal loads in order to prevent damage to the wires 16, which are designed with a flexibility to correct aeolian vibration in a line.

In this respect the frame 12 is formed with a socket 38 for each of the resilient wires 16 and the walls of the socket are adapted to limit the flexing of the wires 16 under abnormal loads.

Abnormal loads of the type referred to are extreme conditions of icing when the conductors are not in use, or the stresses encountered on a short circuit of the conductor line. Under such circumstances all conductors tend to move to the centre with considerable force and, if a stop means were not provided, the resilient wires 16 probably would be stressed beyond their yield point.

The spacer assembly illustrated is about 18 inches high and the diameter of the sockets 38 at their front opening is about 2 inches in the vertical direction. This provides for a one inch deflection up or down from the normal position for the resilient wire 16 under heavy loading conditions. Provision for deflection in the horizontal direction is somewhat greater, as will be apparent from FIGURE 2, but need not be.

The spacer damper assembly illustrated is used on a four conductor bundle transmission line. In such a transmission line the conductors are suspended by means of suspension brackets from spaced apart towers by means of suspension brackets that hold the conductors in a quaded arrangement similar to that of the spacer damper illustrated. Between the suspension brackets it is necessary to provide a spacer, and the spacer illustrated in this specification is mounted on the line, each of the clamps engaging a conductor to maintain the four conductors of the line in quaded arrangement. This is standard practice insofar as the use of suspension brackets and spacers is concerned. The spacer of this invention, in addition to spacing the conductors, is adapted to dampen aeolian vibration.

Aeolian vibration is generally considered to result from a comparatively steady wind blowing across an overhead conductor. In such a case vortices are detached at regular intervals on the lee side of the conductor alternately from the top and bottom portions. The detachment is accompanied by a minute vertical force. The conductor is thus repeatedly subjected to forces that are alternately impressed from above and below.

If the frequency of the forces corresponds approximately to the natural frequency of the span of the conductor between clamps on adjacent spacer damper assemblies, or one of the harmonics of the natural frequency of the span, then the conductor will tend to vibrate with an aeolian vibration. The forces impressed by the wind on the conductor tend to produce travelling waves that move away from the point of application of the forces toward the end of the span. The crest and trough of each wave stores part of the energy it receives from the wind during the course of its travel in the form of increased amplitude. Part of the energy is dissipated in the conductor and part of it is dissipated in a damping device, if a damping device is used, but the vibration amplitude increases until an equilibrum between power input and power dissipation is reached. Damping devices are used to dissipate power and minimize the vibration amplitude.

When the conductors in the clamps 14 tend to vibrate with aeolian vibration, the resilient wires 16 flex, but the frame 12, by reason of its effective weight which, in use, will be a function of the conductors that are mounted therein, does not follow the movement of the conductors. Thus, the spacer damper assembly frame moves with respect to the conductors whereby torque is applied to the conductors along their axes, which alternately loosen and tighten the lay of the strands of the conductors, with a consequent dissipation of energy. The resilience of the wires 16 must be limited such that the effective weight of the spacer damper assembly when mounted on the line is impressed upon the conductors to achieve twisting of the conductors under aeolian vibration. If, for example, the wires 16 are too flexible, aeolian vibration might take place without appreciable twisting of the conductors. This would result in little or no twisting effect of the conductors and little or no dissipaion of energy in this way.

On the other hand, the wires 16 must not be so stiff and lacking resilience that they are rigid because a very substantial portion of the energy of aeolian vibration is dissipated by the wires 16 as the wires 16 are flexed under aeolian vibration. As the flexible wires 16 are flexed under conditions of aeolian vibration, slipping between the strands thereof takes place with a consequent dissipation of energy. The energy dissipation by the work done in deflecting the steel strands of the wires 16 is substantial and is a material factor in reducing aeolian vibration. The wires 16 then must have a resilience that will result in flexing due to aeolian vibration of sufficient magnitude to achieve dissipation of energy as a result of the deflection.

The wires 16 are designed with a strand arrangement, diameter, strength and lay to efficiently dissipate energy of vibration by strand interfriction, as explained above, without failure of the wire normally attributed to fatigue. In this connection it has been found that wires 16, comprised of 19 strands of approximately .10 inch diameter galvanized steel fabricated into a wire having about one-half inch outside diameter, a minimum tensile strength of about 180,000 p.s.i. and a lay factor for the outside layer of strands ranging between 6 to 12 are satisfactory. Other wire designs are, of course, possible and would perform the necessary function. The selection and design are matters of mechanical skill. The endurance limit of stranded cable such as defined by wires 16 is a direct function of stress and for a given movement the stress level becomes a function of individual strand diameter. In other words, a ½ inch diameter cable of 19-strand construction develops a lower bending stress for a specified movement than a ½ inch diameter cable of 7-strand construction. The lower bending stress results in a much higher or improved fatigue life. Also the capacity to absorb vibration by means of interstrand friction tends to be improved with a greater number of strands.

Embodiments of the invention other than the one illustrated are possible and will be apparent to those skilled in the art. The general principles of damping aeolian vibration by dissipating it in twisting of the conductors and flexing of a cable are well known. The inventive concept in this case is the embodiment of these principles into the structure of a spacer damper assembly that is adapted to be serviceable under all service conditions.

What we claim as our invention is:

1. A spacer damper assembly for a bundle of conductors comprising, a frame, a plurality of conductor clamps, a resilient multistrand wire for resiliently mounting each of said clamps on said frame, said resilient wire connecting at one end with said frame and at its other end with its respective clamp, said spacer damper having an effective weight at the point of connection of said resilient wire to said frame, said resilient wire having a resilience that is limited to result in twisting of a conductor held in its respective clamp under the influence of said effective weight when the conductor vibrates under aeolian vibration in use and a resilience that is great enough to result in flexing thereof under the influence of the effective weight when the conductor vibrates under aeolian vibration whereby to dampen aeolian vibration in use, said frame having means for limiting the resilient movement of said resilient wires with respect to said frame that is due to forces other than aeolian vibration and that tend to cause a movement substantially greater than the movement caused by aeolian vibration in use.

2. A spacer damper assembly for a bundle of conductors as claimed in claim 1, in which said frame is formed with a wall that surrounds each of said resilient wires in spaced relation, each of said walls being spaced from its respective resilient wire to form said means for limiting the resilient movement of said resilient wires.

3. A spacer damper assembly as claimed in claim 1, in which said frame has at least one pair of said resilient wires, said wires of said pair having their longitudinal axes aligned.

4. A spacer damper assembly for a bundle of conductors as claimed in claim 1, in which said frame has two pairs of said resilient wires, said wires of each of said pairs having their longitudinal axes aligned.

References Cited

UNITED STATES PATENTS

| | | | |
|---|---|---|---|
| 2,937,225 | 5/1960 | Kaminski et al. | 174—146 X |
| 3,083,258 | 3/1963 | Edwards et al. | 174—42 |
| 3,263,021 | 7/1966 | Caunt | 174—42 |

FOREIGN PATENTS

| | | |
|---|---|---|
| 839,215 | 5/1952 | Germany. |
| 827,743 | 2/1960 | Great Britain. |
| 363,692 | 9/1962 | Switzerland. |

LARAMIE E. ASKIN, *Primary Examiner.*

U.S. Cl. X.R.

174—146